on et al.

United States Patent [19]
Darden et al.

[11] Patent Number: 6,055,016
[45] Date of Patent: Apr. 25, 2000

[54] L-C LOW PASS FILTER CORRELATOR

[75] Inventors: Kim M Darden, Vista; Hokon Olav Flogstad, La Mesa, both of Calif.

[73] Assignee: Eastman Kodak Co., Rochester, N.Y.

[21] Appl. No.: 08/363,133

[22] Filed: Dec. 23, 1994

[51] Int. Cl.[7] .............................. H04N 3/14; H04N 5/228; H04N 9/64
[52] U.S. Cl. .......................... 348/250; 348/222; 348/312; 327/551
[58] Field of Search ..................................... 348/241, 533, 348/534, 607, 683, 250, 222, 312; 327/551; 333/168, 175, 181; H04N 5/217

[56] References Cited

U.S. PATENT DOCUMENTS

| | | |
|---|---|---|
| 3,553,365 | 1/1971 | Jauernik ..................................... 178/7.3 |
| 3,629,714 | 12/1971 | Earp ......................................... 328/151 |
| 4,127,877 | 11/1978 | Morishita et al. . |
| 4,220,967 | 9/1980 | Ichida ....................................... 358/105 |
| 4,283,742 | 8/1981 | Izumita et al. . |
| 4,287,441 | 9/1981 | Smith . |
| 4,757,386 | 7/1988 | Sanner . |
| 4,845,382 | 7/1989 | Eouzan et al. . |
| 4,931,743 | 6/1990 | Fukuda et al. ........................... 328/167 |
| 5,086,344 | 2/1992 | D'Luna et al. . |

OTHER PUBLICATIONS

Sedra & Smith, "Filters and Tuned Amplifiers", 3rd edition (1990) pp. 762–774.

Primary Examiner—Tuan Ho
Assistant Examiner—Ngoc-Yen Vu
Attorney, Agent, or Firm—Ohlandt, Greeley, Ruggiero & Perle

[57] ABSTRACT

An L-C low pass filter correlator circuit for removing noise from an image signal produced by a solid state imaging device such as a CCD sensor.

9 Claims, 3 Drawing Sheets

L-C LOW PASS FILTER CORRELATOR

FIELD OF INVENTION

This invention relates in general to signal processing circuits and more particularly to an L-C low pass filter correlator circuit for eliminating noise in signals which need to be correlated.

BACKGROUND OF THE INVENTION

A signal processing technique known as correlated double sampling is commonly used to eliminate noise in a signal which needs to be correlated. An example of such a signal is the image signal from a solid state imaging device (such as a charge-coupled device (CCD) image sensor) in order to obtain low noise performance. Correlated double sampling is equivalent to subtracting a reset reference level ($V_{reset}$) from an image level ($V_{image}$) for each output pixel from the CCD image sensor.

A CCD output circuit, shown in FIG. 1, converts the photoelectrically generated signal charge to a voltage signal. Charge packets from the CCD imager photosites (not shown) are transferred into a horizontal shift register 10. The charge packets are shifted horizontally via horizontal clocks H1 and H2 and onto a floating diffusion node 12 via output gate 13. The potential of the floating diffusion node 12 changes linearly in proportion to the number of electrons in the charge packet. The potential of the floating diffusion node 12 is applied to the input gate of a two stage source follower circuit 14, producing a signal at $V_{out}$. A reset transistor 16 driven by the reset clock RESET recharges the floating diffusion node 12 to the positive potential $V_{rd}$ before the arrival of each new charge packet from the horizontal shift register 10.

FIG. 2(A) shows the signal waveform $V_{out}$ at the output of the source follower 14 of FIG. 1. The waveform contains three components: the reset clock feedthrough ($V_{ft}$), the reset reference level ($V_{reset}$), and the image level ($V_{image}$). The feed through $V_{ft}$ occurs as a result of capacitive coupling between the RESET gate 16 and the floating diffusion node 12. When the floating diffusion 12 is reset, the exact reset voltage is affected by "thermal" noise, whose level depends on the capacitance of the floating diffusion node 12 and the temperature. The same random reset noise voltage affects the level of both the reference level $V_{reset}$ and the image level $V_{image}$. By taking the difference between samples of $V_{reset}$ and $V_{image}$ for each pixel, this "thermal" noise can be eliminated. This also reduces low frequency noise from the two stage source follower output amplifier 14.

A commonly known circuit for performing correlated double sampling is shown in FIG. 3 (see, for example, the circuits disclosed in U.S. Pat. Nos. 4,283,742 and 4,845,382). The signal $V_{out}$ from the circuit of FIG. 1 forms the input signal $V_{in}$ to sample/hold circuits 20 and 22, and the output of the sample/hold circuit 20 is further sampled by a sample/hold circuit 24. The aforementioned difference signal $V_D$ is taken between the outputs of the sample/hold circuits 22 and 24 by a subtracting circuit 26. FIGS. 2(B) and 2(C) show the sampling waveforms S/H(1) and S/H(2) that respectively drive the sample/hold circuit 20, and the sample/hold circuits 22 and 24. Sampling pulses from the waveform S/H(1) cause the sample/hold circuit 20 to sample the resent reference level ($V_{reset}$). Sampling pulses from the waveform S/H(2) cause the sample/hold circuit 22 to sample the image level ($V_{image}$), while simultaneously causing the sample/hold 24 to sample the output of the sample/hold circuit 20, thus effecting a delay in the reset reference level ($V_{reset}$). A noise-free image signal $V_D$ (shown in FIG. 2(D)) is then obtained from the differencing circuit 26 by taking the difference between the outputs of the sample/hold circuits 22 and 24.

Another correlating circuit utilizing a delay line and sample-and-hold circuits is disclosed in U.S. Pat. No. 4,287,441, issued Sep. 1, 1981, inventor Smith. U.S. Pat. No. 5,086,344, issued Feb. 4, 1992, inventors D'Luna et al., discloses a digital correlated double sampling circuit for sampling the output of an image sensor.

The following patents disclose the use of low pass filters in conjunction with CCD sensors, but not as double-correlated sampling circuits. U.S. Pat. No. 4,757,386, issued Jul. 12, 1988, inventor Ganner; U.S. Pat. No. 4,127,877, issued Nov. 28, 1978, inventors Morishita et al.

A problem exists in the correlator signal processing circuits disclosed in these patents. Since these circuits use active circuit elements (e.g., sample and hold circuits) which rely on additional timing and control circuitry for operation, the prior art correlator circuits are disadvantageously complex and expensive.

SUMMARY OF THE INVENTION

According to the present invention, there is provided an L-C low pass filter correlator circuit which solves the problems of known correlator circuits. The correlator circuit of the present invention has the following advantages.

1. Simple.
2. More accurate.
3. Inexpensive.
4. Completely passive.
5. Analog-to-digital converter can be used directly without sample-and-hold circuits and associated timing and control circuitry.

According to an aspect of the present invention, there is provided a correlator circuit for removing noise from a signal, such as an image signal, comprising an input section for receiving an analog signal having a period including a first interval with a first signal value and a second interval with a second signal value, said input section including a series capacitor and parallel input resistor; a low pass filter section coupled to said input section and including at least one series inductor, parallel capacitor (L-C) low pass filter section; and an output section coupled to said low pass filter section for outputting an output analog signal across an output resistor, said output signal being free from noise and having a signal value which is a function of the difference between said first signal value and said second signal value.

DESCRIPTION OF THE PREFERRED EMBODIMENTS

Although a preferred embodiment of the present invention will be described below with specific reference to image signal processing, it will be understood that the correlator circuit of the present invention may be used to remove noise from any signal.

Figure 1:
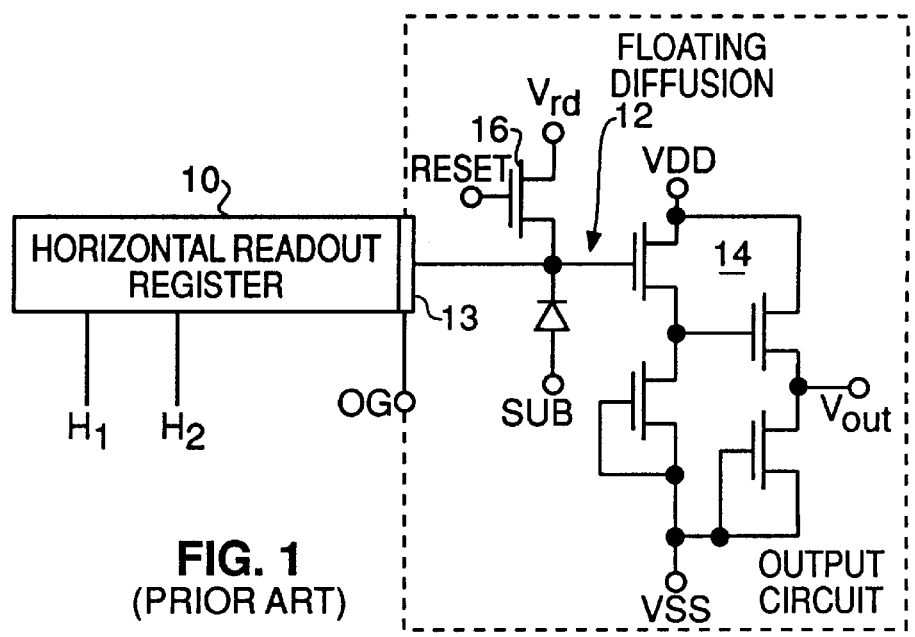
FIG. 1 is a schematic diagram showing a known output circuit for a solid state imaging device.
Figure 2:
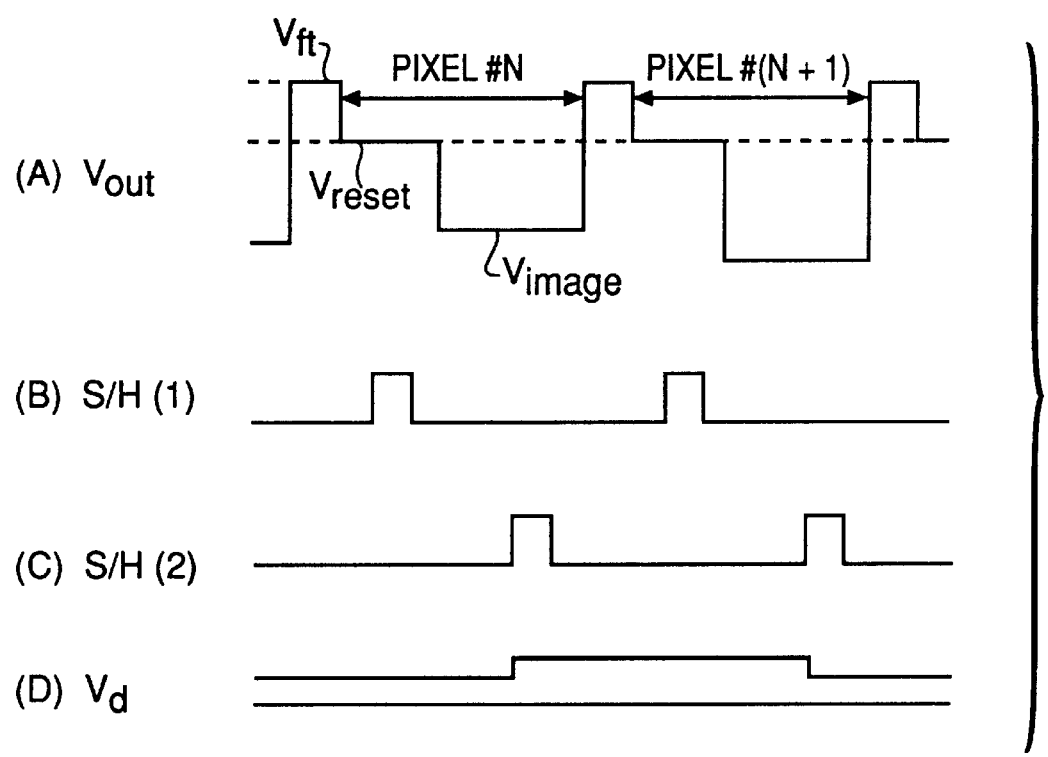
FIG. 2 shows the signal waveform (FIG. 2(A)) developed by the known circuit of FIG. 1 and illustrates (FIGS. 2(B), 2(C)) the points at which the waveform may be double sampled to obtain an image signal difference waveform (FIG. 2(D)).
Figure 3:
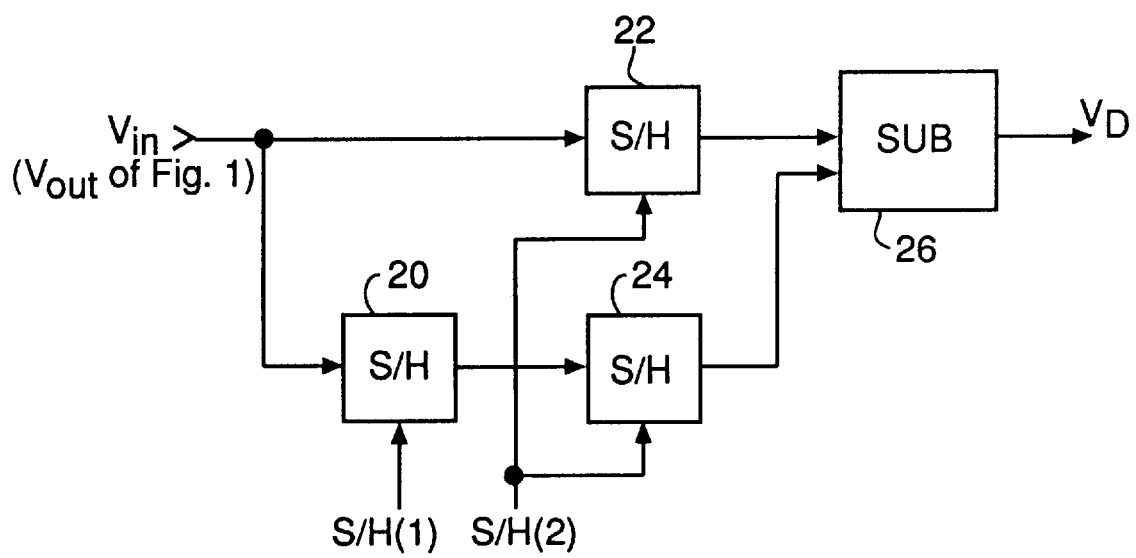
FIG. 3 is a block diagram of a known circuit for performing correlated double sampling of the waveform of FIG. 2(A) according to the sample waveforms of FIGS. 2(B) and 2(C).
Figure 4:
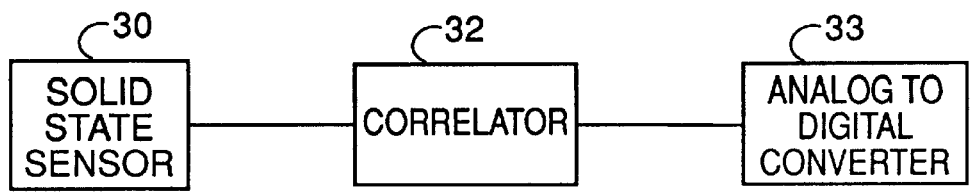
FIG. 4 is a block diagram of a video signal processing circuit incorporating the present invention.

Referring now to FIG. 4, there is shown an image signal processing circuit incorporating a correlator circuit according to the present invention. As shown, a solid state image sensor 30 (such as a CCD or MOS sensor) produces an image signal such as shown in FIG. 2(A). The image signal has a pixel period including a first interval with a reset signal value (reset voltage) and a second interval with an image signal value (image voltage). Noise which is present in both of the pixel intervals is eliminated by passive correlator circuit 32. The output of correlator circuit 32 is a signal representing the pixel image information without low frequency noise. This analog signal is sampled and converted to a digital signal by analog-to-digital converter 33.

Figure 5:
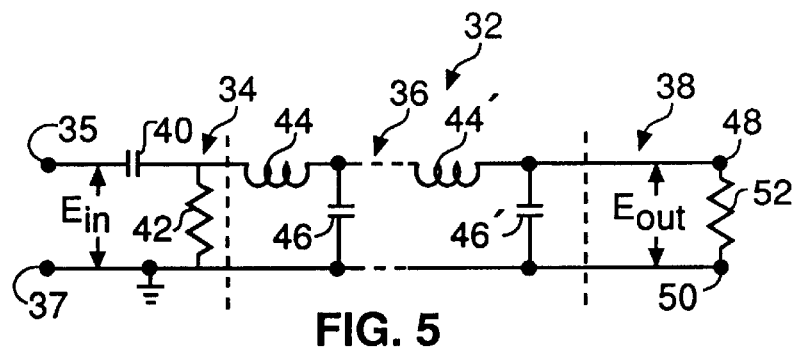
FIG. 5 is a schematic diagram of an embodiment of the correlator circuit of the present invention.

Referring now to FIG. 5, there is shown a preferred embodiment of correlator circuit according to the present invention. As shown, correlator circuit 32 includes an input section 34 which receives an analog signal $E_{in}$ (image signal) at terminals 35, 37 having a period including a first interval with a first signal value and a second interval with a second signal value. In the preferred embodiment shown in FIG. 4, the analog input signal is an image (pixel) signal. Correlator circuit 32 also includes a low pass filter section 36 and an output section 38 for outputting a noise free signal which is a function of the difference between the first and second signal values. Input section 34 includes a series capacitor 40 and a parallel input resistor 42. The low pass filter section 36 is a low pass filter including at least one L-C section of series inductor 44 and parallel capacitor 46 (44',46'). Output section 38 outputs output signal $E_{out}$ at output terminals 48,50 of output resistor 52. Resistors 42 and 52 preferably have the same values.

Figure 6:
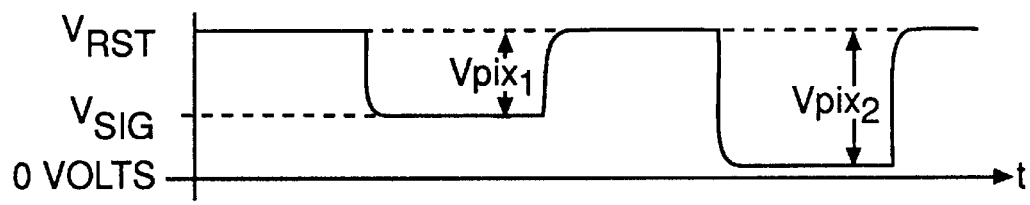
FIGS. 6 and 7 show waveform diagrams useful in explaining the operation of the correlator circuit of FIG. 5.
Figure 7:
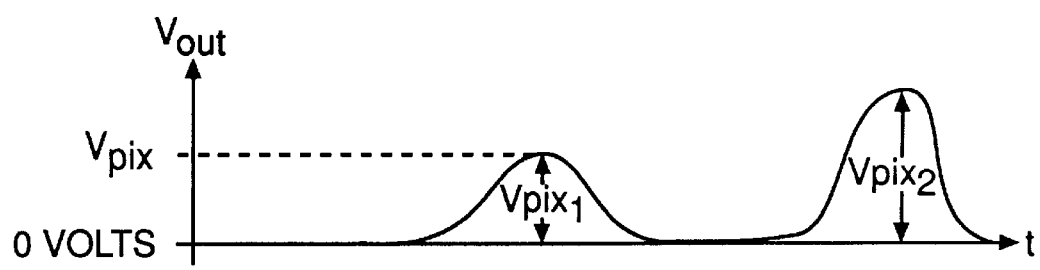

The output voltage of a CCD imager is depicted in FIG. 6. A correlator circuit measures the difference voltage between $V_{rst}$ and $V_{sig}$ and outputs this voltage, $V_{pix}$, with respect to ground (FIG. 7). The L-C low pass filter correlator of FIG. 5 constructed from a L-C low pass filter by exchanging the input resistor (termination resistor) with the first capacitor. Any L-C based passive low pass filter will function as a correlator, but the wave shape delivered to the output and the group dispersion (filter's time delay as a function of frequency) will be characteristic of that filter. The low pass filter used in this example is a Bessel Filter as can be seen by the characteristic impulse response (FIG. 7).

The L-C low pass filter correlator works by sampling the input's voltage differences during the filter's characteristic time (approximately $T_{rise}$) on the input capacitor 40. This sampled energy is dissipated by both input resistor 42 and the output termination resistor 52 returning the output voltage to zero (ground) after the pixel time. The high frequencies of the CCD voltage are filtered out by the low pass filter and low frequencies of the CCD voltage are too slow to inject energy on the input capacitor 40. Therefore, the voltage at the output of the L-C low pass filter correlator of the invention is a pulse characteristic impulse response of the low pass filter with respect to ground whose height is proportional to the difference between the CCD's reset voltage and the CCD's signal voltage (FIGS. 6 and 7).

Advantages

The correlator circuit of the invention has optimal efficiency in low frequency applications. The circuit is simple, inexpensive, very accurate, completely passive without active circuitry such as sample-and-hold circuits and associated timing and control circuitry, and can be used directly with an analog-to-digital converter.

The invention has been described in detail with particular reference to a presently preferred embodiment, but it will be understood that variations and modifications can be effected within the spirit and scope of the invention.

What is claimed is:

1. A correlator circuit for removing noise from a signal, comprising:

an input section for receiving an analog signal having a period including a first interval with a first signal value and a second interval with a second signal value, said input section including a series capacitor and parallel input resistor;

a passive, double correlating low filter section coupled to said input section and including at least one series inductor, parallel capacitor (L-C) low pass filter section; and an output section coupled to said low pass filter section for outputting an output analog signal across an output resistor, said output signal being free from noise and having a signal value which is a function of the difference between said first signal value and said second signal value.

2. The correlator circuit of claim 1 including a analog-to-digital converter coupled to said output section for converting said output signal into a digital signal.

3. The correlator circuit of claim 1 wherein said input resistor and said output resistor have substantially equal resistance values.

4. The correlator circuit of claim 1 wherein said low pass filter section includes a plurality of cascaded L-C low pass filter sections.

5. The correlator circuit of claim 1 wherein said low pass filter section is configured as a Bessel filter.

6. The correlator circuit of claim 1 wherein said input section receives an image signal having a pixel period including a first interval with a reset signal value and a second interval with an image signal value; and wherein said output section outputs an image signal which is a function of the difference between said reset signal value and said image signal value.

7. The correlator circuit of claim 6 including an image signal source coupled to said input section for providing said image signal.

8. The correlator circuit of claim 7 wherein said image signal source is a solid state sensor.

9. The correlator circuit of claim 8 wherein said solid state sensor is a CCD sensor.

* * * * *

UNITED STATES PATENT AND TRADEMARK OFFICE
CERTIFICATE OF CORRECTION

PATENT NO. : 6,055,016
DATED : April 25, 2000
INVENTOR(S) : Kim M. Darden and Hokon Olav Flogstad It is certified that error appears in the above-identified patent and that said Letters Patent is hereby corrected as shown below:

Claim 1, Column 4, line 26, in between "low" and "filter" insert --pass-- to read --low pass filter--.

Signed and Sealed this

First Day of May, 2001

Attest:

NICHOLAS P. GODICI

Attesting Officer        Acting Director of the United States Patent and Trademark Office